UNITED STATES PATENT OFFICE.

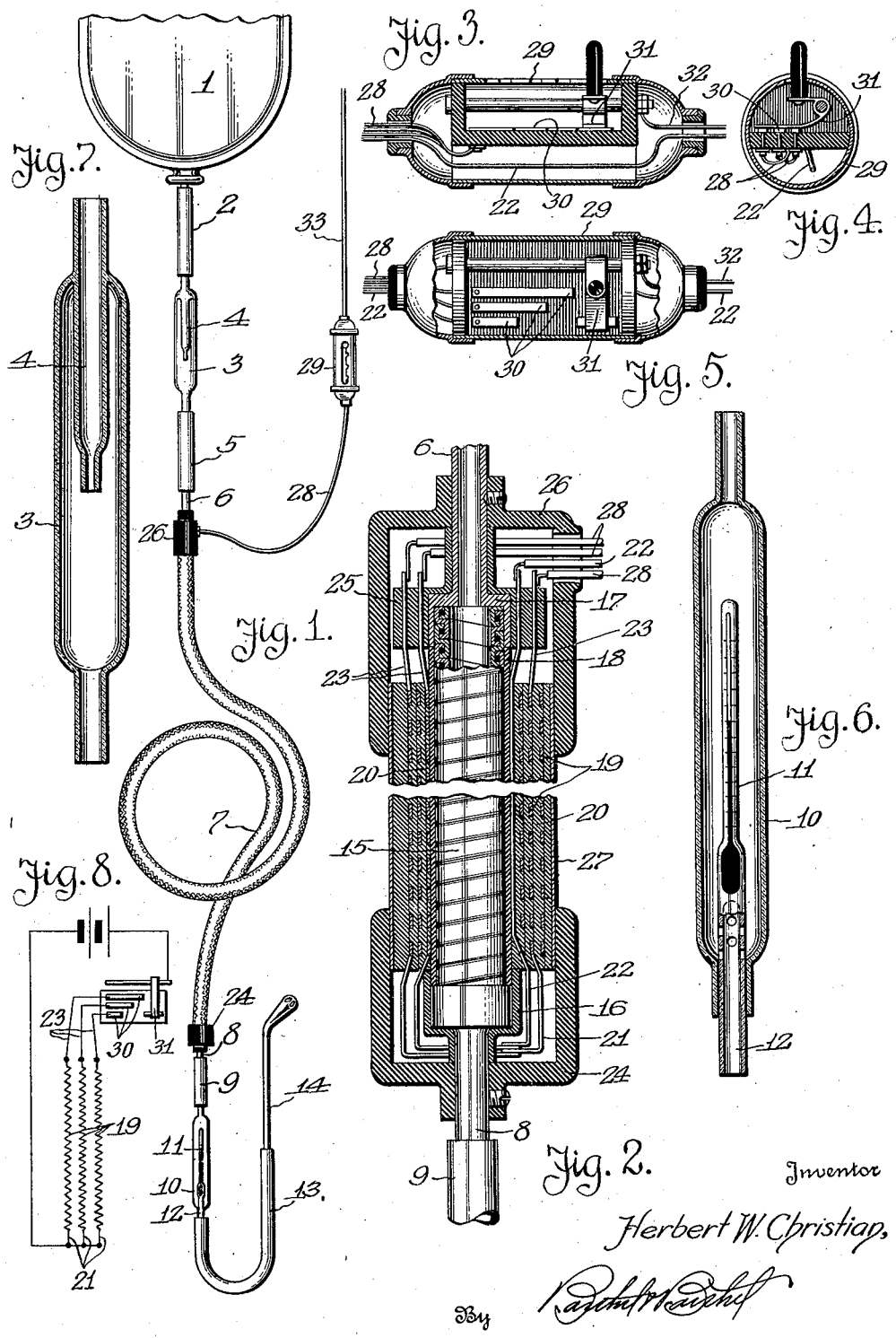

HERBERT W. CHRISTIAN, OF DETROIT, MICHIGAN.

FLEXIBLE WATER HEATER AND DRIPPER.

1,390,500.   Specification of Letters Patent.   Patented Sept. 13, 1921.

Application filed August 8, 1919. Serial No. 316,070.

*To all whom it may concern:*

Be it known that I, HERBERT W. CHRISTIAN, a citizen of the United States of America, residing at Detroit, in the county of Wayne and State of Michigan, have invented certain new and useful Improvements in Flexible Water Heaters and Drippers, of which the following is a specification, reference being had therein to the accompanying drawings.

My invention aims to provide an electrically heated apparatus by which water and other liquid may be easily and quickly heated by a minimum expenditure of current, the apparatus including a flexible water conduit in which water is heated while passing therethrough or while temporarily retained within the conduit. The flexibility of the conduit facilitates the use of the apparatus, particularly when employed as a water dripper by doctors and nurses in the treatment of patients. It is in this connection that the apparatus is portable and may be used any place where an ordinary electric light circuit or a suitable source of electrical energy is convenient for the attachment of the apparatus.

My invention further aims to provide a combined water heater and dripper embodying a rheostat, dripper, thermometer and flexible connections with a heating element, all of which may be compactly assembled and regulated to deliver a desired quantity of water or other liquid at a desired temperature.

My invention will be hereinafter more fully considered and then claimed, and references will now be had to the drawing, wherein—

Figure 1 is a front elevation of the apparatus with the reservoir thereof partly broken away;

Fig. 2 is an enlarged longitudinal sectional view of a portion of the heating device;

Fig. 3 is a longitudinal sectional view of a rheostat adapted to form part of the apparatus;

Fig. 4 is a cross sectional view of the same;

Fig. 5 is a plan of the rheostat partly broken away;

Fig. 6 is an enlarged detail view of the thermometer adapted to form part of the apparatus;

Fig. 7 is an enlarged detail view of the dripper of the apparatus, and

Fig. 8 is a diagrammatic view illustrating the electrical connections of the apparatus.

In the drawing, the reference numeral 1 denotes a reservoir or suitable receptacle adapted to contain water or any other liquid, and said receptacle may be conveniently in the form of a water bag or container that may be supported at a height so that water will flow therefrom by gravity.

Connected to the outlet of the reservoir 1 is a tube 2 and connected to said tube is a dripper 3, which is in the form of an oblong bulb containing a nipple or restriction member 4 that causes the contents of the reservoir 1 to flow into the dripper, drop by drop.

Connected to the dripper 3, by a tube 5 is a nipple 6 of a flexible heating element or device, generally designated 7 and said element or device has another nipple 8 connected by a tube 9 to a thermometer bulb 10 containing a thermometer 11. As shown in Fig. 6 the thermometer 11 may be mounted in the bulb 10 and the lower portion of the thermometer constructed so that water entering the bulb 10 will be in proximity to the lower portion of the thermometer which may be conveniently made so as to provide an outlet nipple 12 for a tube 13 connected to a nozzle or ejector member 14.

Considering the detail construction of the heating element or device, there is an inner flexible metallic conduit 15 having one end thereof extending into an insulated socket 16 carried by the nipple 8 and the opposite end thereof extending into an insulated socket 17 carried by the nipple 6, the ends of the conduit being cemented or otherwise secured in the sockets 16 and 17 so as to insure a non-leakable flexible connection between the nipples 6 and 8.

On the conduit 15, between the sockets 16 and 17 is an insulating sleeve 18 and surrounding said sleeve are a plurality of resistance coils 19 separated from each other by sleeves of insulation 20. The resistance coils 19 have the ends 21 thereof connected to leading out wires 22 and the opposite ends of said resistance coils have leading out wires 23. The end wires 21 of the resistance coils are inclosed, by a cap 24 mounted on the nipple 8 and the leading out wires 23 are supported in an insulator 25 which is inclosed by a cap 26 mounted on the nipple 6. The caps 24 and 26 support a cover 27 which may also be made of a flexible insulating material.

Extending into the cap 26 and connected to the wires 23 and 22 is a cord or conductor 28 which extends into a rheostat casing 29. The cord or conductor contains sufficient wires to provide proper connections with the heating device, and as shown there are three wires in addition to the leading out wire 22, which is a common return extending through the rheostat casing 29. The other three wires are connected to contact bars 30 adapted to be engaged by a sliding contact member 31 which may be easily and quickly adjusted in the casing 29 so as to establish connections for a desired amount of current in connection with a heating device. The sliding contact member 31 has a leading out wire 32 and this wire and the common return wire 22 are carried in a cord or conductor 33 leading to a suitable source of electrical energy, for instance an ordinary electric lighting circuit. The rheostat may be conveniently of that form disclosed in my Patent No. 1,292,403, granted Jan. 29, 1919, and my entire apparatus is of a simple form for attaining practically the same result as set forth in my Patent No. 1,302,309 granted April 29, 1919, on a combined water heater and dripper. In the present invention the flexible heating unit or element permits of water or other liquid being quickly heated as it passes therethrough and through the medium of the rheostat it is possible to obtain a desired degree of heat and to shut off the apparatus after having been used. I attach considerable importance to the flexible heating unit and this unit, together with the tubes 2, 5, 9 and 13 permit of the apparatus being folded to occupy a comparatively small space, particularly when it is necessary for a doctor to carry the same.

What I claim is:—

The combination of a reservoir, a flexible electrically heated conduit in communication therewith, means for changing the temperature in said conduit, a dripper interposed between said reservoir and said conduit, a nozzle communicating with said conduit, and a thermometer interposed between said nozzle and said conduit and all of said elements being flexibly connected together.

In testimony whereof I affix my signature in the presence of two witnesses.

HERBERT W. CHRISTIAN.

Witnesses:
 FRED H. BRYANT,
 KARL H. BUTLER.